US008237431B2

(12) United States Patent
Fruehling et al.

(10) Patent No.: US 8,237,431 B2

(45) Date of Patent: Aug. 7, 2012

(54) WHEEL SPEED SENSOR

(76) Inventors: Terry Fruehling, Hartford, WI (US); Kelly Possehl, Elkhorn, WI (US); Brian Schneider, Franklin, WI (US); Matt Leroy, Darien, WI (US); Tyler Kulig, New Berlin, WI (US); Jon Hamilton, Kitchener (CA); Jens Anton Heim, Bergrheinfeld (DE)

( * ) Notice: Subject to any disclaimer, the term of this patent is extended or adjusted under 35 U.S.C. 154(b) by 722 days.

(21) Appl. No.: 12/168,655

(22) Filed: Jul. 7, 2008

(65) Prior Publication Data

US 2009/0051349 A1 Feb. 26, 2009

Related U.S. Application Data

(60) Provisional application No. 60/948,097, filed on Jul. 5, 2007.

(30) Foreign Application Priority Data

Jul. 4, 2008 (DE) ........................ 10 2008 031 665
Jul. 4, 2008 (JP) ................................ 2008-175805

(51) Int. Cl.
*G01B 7/30* (2006.01)

(52) U.S. Cl. .................................. 324/207.25; 324/173

(58) Field of Classification Search .................. 324/173, 324/207.25

See application file for complete search history.

(56) References Cited

U.S. PATENT DOCUMENTS

| | | | |
|---|---|---|---|
| 3,793,545 | A | 2/1974 | Lieber et al. |
| 4,421,359 | A | 12/1983 | Hayashi et al. |
| 4,494,800 | A | 1/1985 | Hayashi |
| 4,702,339 | A | 10/1987 | Hayashi et al. |
| 4,948,277 | A | 8/1990 | Alff |
| 4,989,922 | A | 2/1991 | Pickenhahn et al. |
| 5,094,511 | A | 3/1992 | Becker et al. |
| 5,150,298 | A | 9/1992 | Fujioka et al. |
| 5,244,259 | A | 9/1993 | Pickenhahn et al. |
| 5,249,848 | A | 10/1993 | Matsuto et al. |
| 5,257,856 | A | 11/1993 | Ota et al. |
| 5,324,102 | A | 6/1994 | Roll et al. |
| 5,332,301 | A | 7/1994 | Roll et al. |
| 5,344,220 | A | 9/1994 | Roll et al. |
| 5,386,366 | A | 1/1995 | Roll et al. |
| 5,388,916 | A | 2/1995 | Ohtsuki et al. |
| 5,411,325 | A | 5/1995 | Tanaka et al. |
| 5,416,708 | A | 5/1995 | Matsuto et al. |
| 5,419,625 | A | 5/1995 | Iwase et al. |
| 5,431,413 | A | 7/1995 | Hajzler |

(Continued)

FOREIGN PATENT DOCUMENTS

DE 69106336 11/1991

(Continued)

OTHER PUBLICATIONS

International Search Report, PCT/DE2006/000423, Mar. 7, 2006.

(Continued)

*Primary Examiner* — Bot Ledynh

(74) *Attorney, Agent, or Firm* — Banner & Witcoff, Ltd.

(57) ABSTRACT

A speed sensor assembly includes a bearing having a first race, a second race, a plurality of ball bearings separating the first race from the second race, and a tone wheel coupled to the second race. The speed sensor assembly also includes a spacer abutting the first race and a sensor positioned adjacent the tone wheel.

21 Claims, 13 Drawing Sheets

100 145 140 105 125 120 130 110 135

U.S. PATENT DOCUMENTS

| | | | | |
|---|---|---|---|---|
| 5,435,636 | A | 7/1995 | Sasanoi | |
| 5,438,260 | A * | 8/1995 | Rigaux et al. | 324/166 |
| 5,444,625 | A | 8/1995 | Tanaka et al. | |
| 5,445,443 | A | 8/1995 | Hauser et al. | |
| 5,508,608 | A | 4/1996 | Goossens | |
| 5,575,568 | A | 11/1996 | Rigaux et al. | |
| 5,755,517 | A * | 5/1998 | Nicot | 384/448 |
| 5,873,658 | A * | 2/1999 | Message et al. | 384/448 |
| 5,934,771 | A | 8/1999 | Ishikawa et al. | |
| 5,998,989 | A | 12/1999 | Lohberg | |
| 6,094,046 | A | 7/2000 | Message et al. | |
| 6,179,471 | B1 | 1/2001 | Moretti et al. | |
| 6,203,204 | B1 | 3/2001 | Carmichael | |
| 6,215,297 | B1 * | 4/2001 | Bleckmann et al. | 324/166 |
| 6,238,017 | B1 | 5/2001 | Eitel | |
| 6,323,640 | B1 | 11/2001 | Forestiero et al. | |
| 6,338,576 | B1 | 1/2002 | Girardin et al. | |
| 6,339,964 | B1 | 1/2002 | Bertelli | |
| 6,538,427 | B1 | 3/2003 | Silvasi et al. | |
| 6,549,001 | B1 | 4/2003 | Dobbs et al. | |
| 6,655,844 | B1 | 12/2003 | Message et al. | |
| 6,687,644 | B1 | 2/2004 | Zinke et al. | |
| 6,715,848 | B2 | 4/2004 | Chen et al. | |
| 6,799,812 | B2 | 10/2004 | Risch et al. | |
| 6,879,148 | B2 | 4/2005 | Ruetter et al. | |
| 6,906,509 | B2 * | 6/2005 | Tomioka | 324/174 |
| 7,194,921 | B1 | 3/2007 | Fergus et al. | |
| 7,255,014 | B2 * | 8/2007 | Suzuki | 73/862.321 |
| 7,345,469 | B2 | 3/2008 | Swansno | |
| 7,350,976 | B2 * | 4/2008 | Ohtsuki et al. | 384/448 |
| 7,445,388 | B2 * | 11/2008 | Shigeoka et al. | 384/448 |
| 7,675,212 | B2 * | 3/2010 | Kobayashi | 310/90.5 |
| 7,692,422 | B2 * | 4/2010 | Yamamoto et al. | 324/174 |
| 2001/0000713 | A1 * | 5/2001 | Nakamura et al. | 384/448 |
| 2002/0167305 | A1 | 11/2002 | Sentoku et al. | |
| 2003/0091253 | A1 * | 5/2003 | Morita et al. | 384/448 |
| 2004/0141669 | A1 | 7/2004 | Landrieve et al. | |
| 2005/0017586 | A1 | 1/2005 | Giai et al. | |
| 2005/0134114 | A1 | 6/2005 | Asahi | |
| 2005/0135717 | A1 | 6/2005 | Monetti et al. | |
| 2005/0168059 | A1 | 8/2005 | Nishikawa et al. | |
| 2005/0168062 | A1 | 8/2005 | Nishikawa et al. | |
| 2005/0168063 | A1 | 8/2005 | Tani et al. | |
| 2005/0218715 | A1 | 10/2005 | Borgemenke et al. | |
| 2007/0029995 | A1 * | 2/2007 | Ichiman | 324/174 |
| 2007/0253653 | A1 * | 11/2007 | Shigeoka et al. | 384/448 |
| 2008/0166079 | A1 | 7/2008 | Heim et al. | |
| 2009/0190872 | A1 * | 7/2009 | Sahashi et al. | 384/448 |

FOREIGN PATENT DOCUMENTS

| | | |
|---|---|---|
| DE | 4243623 | 12/1992 |
| DE | 4339894 | 5/1994 |
| DE | 19644744 | 10/1996 |
| DE | 20206099 | 4/2002 |
| FR | 2879748 | 6/2006 |
| JP | 3279061 | 12/1991 |
| JP | 7180578 | 7/1995 |
| JP | 2001337097 | 12/2001 |
| JP | 2005178633 | 7/2005 |
| WO | 2006097072 | 9/2006 |

OTHER PUBLICATIONS

International Preliminary Report on Patentability, PCT/DE2006/000423, Mar. 10, 2007.

Office Action from German Patent Application No. 102008031665.2-52, Jan. 13, 2009.

German Office Action from Application No. 10 2008 031 665.2 mailed May 22, 2012.

* cited by examiner 155
160
140
150

145
210
215

243
247
245
250

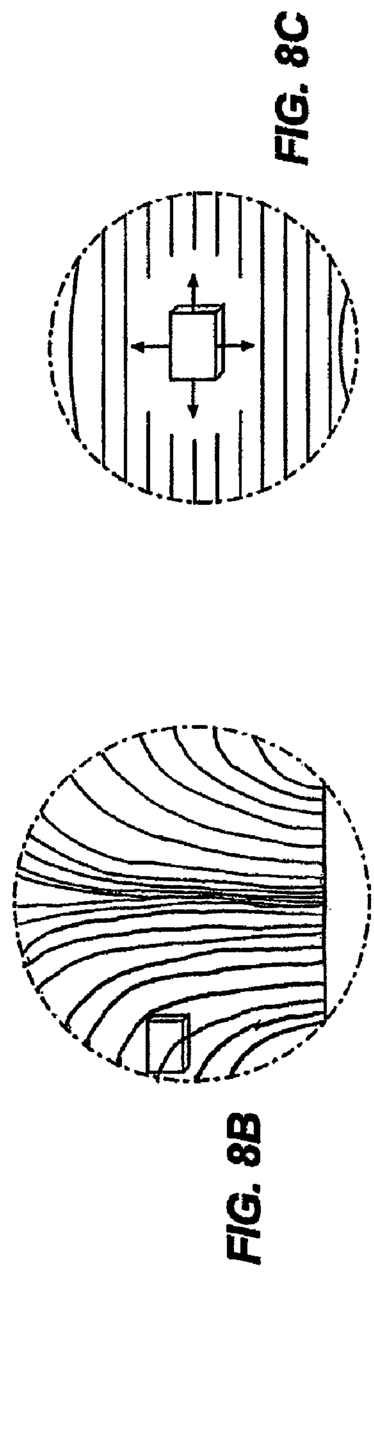
FIG. 8B
FIG. 8C
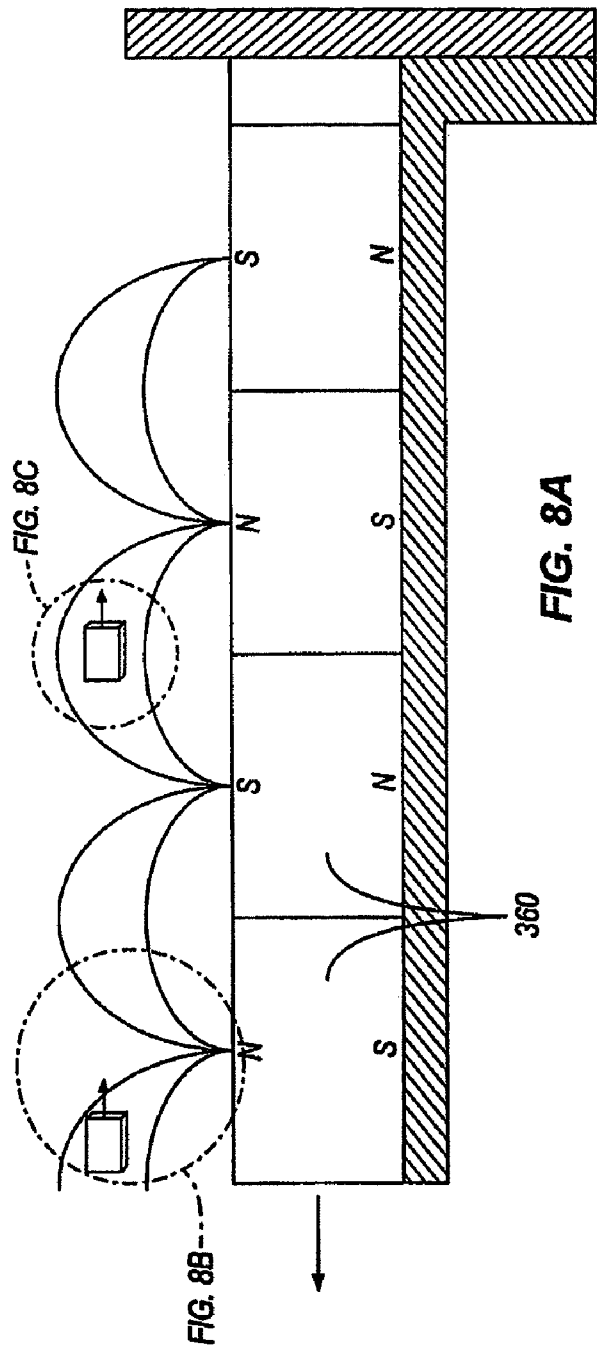
FIG. 8A

WHEEL SPEED SENSOR

RELATED APPLICATIONS

This application claims priority to U.S. Provisional Patent Application No. 60/948,097, filed on Jul. 5, 2007, the contents of which are incorporated herein by reference and made part hereof.

BACKGROUND

It is often necessary to know the speed of a wheel of a vehicle, e.g., an automobile or a motorcycle. For example, anti-lock braking systems need to know when a wheel is "locking up" in order to release a brake and prevent the wheel from skidding. In addition, the speed of a wheel is often used to determine the speed of a vehicle and provide an indication of the speed to an operator.

Past systems for determining wheel speed have used mechanical couplings (e.g., speedometer cables) or sensors. Typical systems employing sensors have used a magnetic ring frictionally coupled to the wheel, along with a Hall sensor to detect the magnetic field from the ring and determine the speed of the wheel. These sensor-based systems have various drawbacks including bulky size and difficulty in mounting in order to achieve the correct frictional coupling and to correctly position the sensor in the magnetic field.

SUMMARY

Aspects of the invention relate to a speed sensor assembly including a bearing having a first race, a second race, a plurality of ball bearings separating the first race from the second race, and a tone wheel coupled to the second race. The speed sensor assembly also includes a spacer abutting the first race and a sensor positioned adjacent the tone wheel. The sensor is configured to detect rotation of the tone wheel in order to determine the rotational speed of the wheel.

Additional aspects of the invention relate to a method of manufacturing a wheel speed sensor. The method includes the acts of mounting a tone wheel on a carrier, press fitting the carrier into a first race of a bearing, press fitting a flinger onto a second race of the bearing adjacent to the carrier, mounting the bearing on an axle, and abutting a spacer to the second race adjacent to the flinger. The spacer includes a sensor configured to detect rotation of the tone wheel in order to determine the rotational speed of the wheel.

Further aspects of the invention relate to a motorcycle incorporating a wheel speed sensor as described above. The motorcycle includes a front wheel assembly, a rear wheel assembly, and a wheel speed sensor. The wheel speed sensor includes a bearing having a first race, a second race separated from the first race by a plurality of ball bearings, a carrier press fit into the second race, and a tone wheel mounted to the carrier. The wheel speed sensor also includes a spacer abutting the first race, and a sensor mounted to the spacer. At least one of the front wheel assembly and the rear wheel assembly includes the wheel speed sensor. The sensor is configured to detect rotation of the tone wheel in order to determine the rotational speed of the wheel of the respective wheel assembly.

Other aspects of the invention will become apparent by consideration of the detailed description and accompanying drawings.

BRIEF DESCRIPTION OF THE DRAWINGS

To understand the present invention, it will now be described by way of example, with reference to the accompanying drawings in which:

FIGS. 8A-8C depict a sensor passing through a magnetic field of a tone ring according to an embodiment of the invention;

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The terms "first," "second," "third," etc., as used herein, are intended for illustrative purposes only and do not limit the embodiments in any way. Additionally, the term "plurality," as used herein, indicates any number greater than one, either disjunctively or conjunctively, as necessary, up to an infinite number. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. In addition, "adjacent" is not intended to imply the absence of one or more elements between adjacent elements.

Embodiments of the invention include a wheel speed sensor having an encoder incorporated into a wheel bearing and a magnetoresistive (MR) sensor (e.g., an anisotropic MR sensor) incorporated into a wheel spacer. The wheel speed sensor can be relatively small and substantially hidden from view when installed on a motorcycle.

Figure 1:
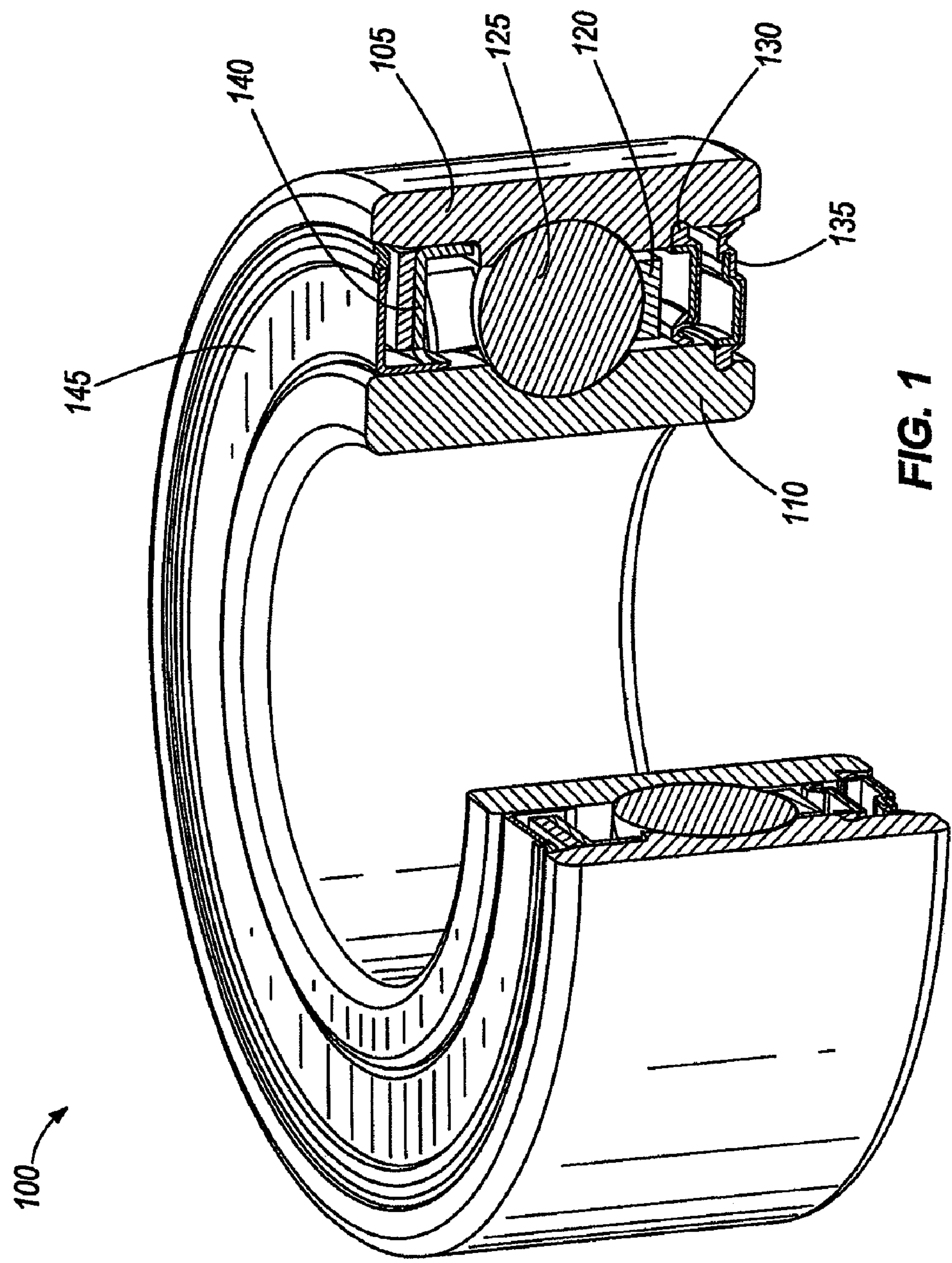
FIG. 1 is a perspective view, including a cut-away section, of a bearing according to an embodiment of the invention.
Figure 2:
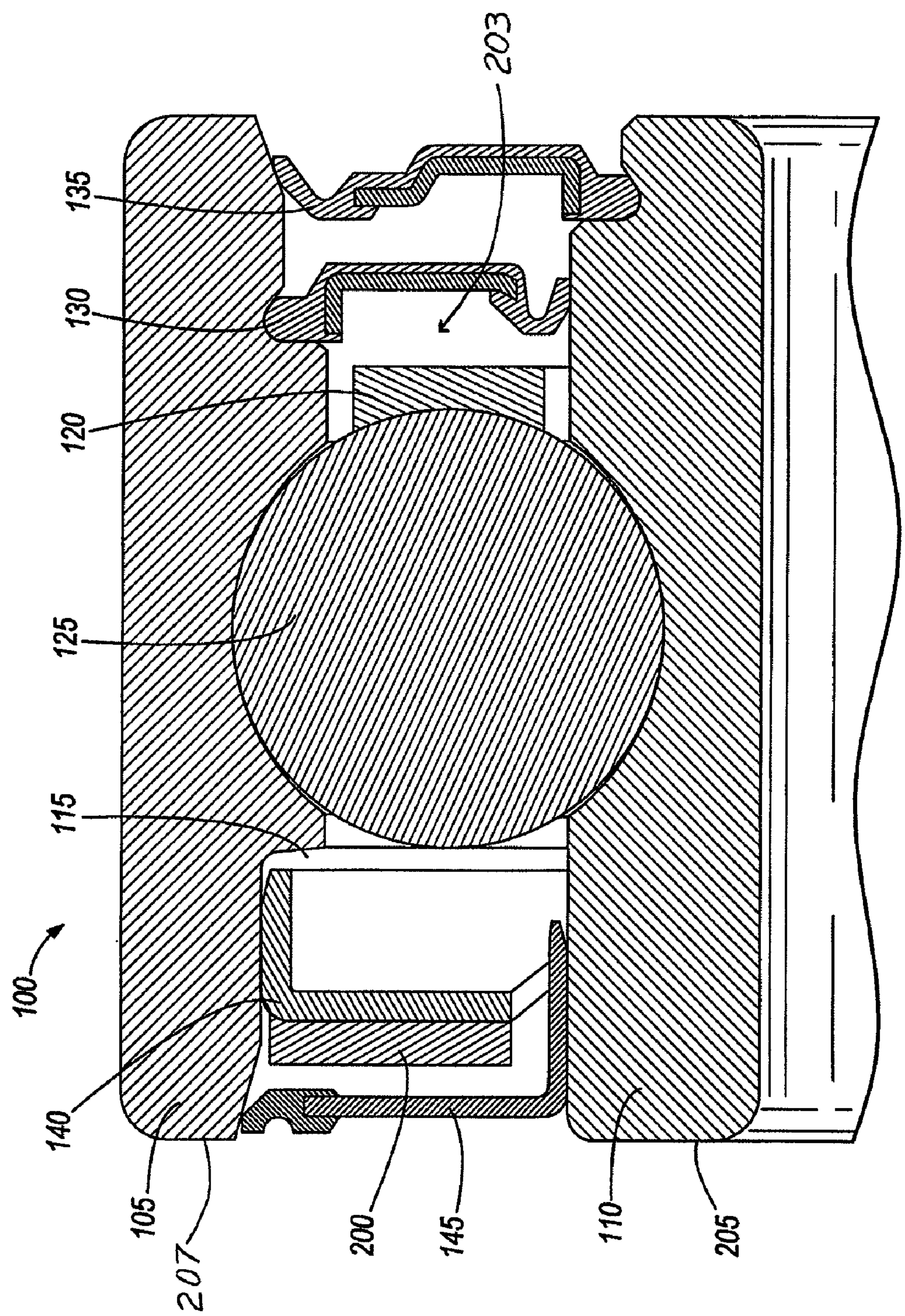
FIG. 2 is a cut-away view of the bearing of FIG. 1.

FIGS. 1 and 2 illustrate one exemplary embodiment of a wheel bearing 100 according to the invention. The wheel bearing 100 is configured to be mounted on a stationary axle and to enable a wheel, mounted on the bearing, to rotate with a minimal amount of friction. The wheel bearing 100 includes an outer race 105, an inner race 110, an inner ring 115, a bearing cage 120, a plurality of ball bearings 125, a first inner seal 130, a second inner seal 135, an encoder 140, and a flinger 145, such as the bearing described in International Application No. PCT/WO2006-097092, filed Mar. 6, 2006, and claiming the benefit of U.S. Provisional Patent Application No. 60/663,355, filed Mar. 18, 2005, the entire contents of both of which are hereby incorporated by reference and made part hereof.

The inner ring 115 and cage 120 maintain the ball bearings 125 in position around the circumference of the wheel bearing 100. The ball bearings 125 are positioned within an annular space 203 defined between the outer race 105 and the inner race 110. In addition, the first inner seal 130 and the second inner seal 135 function to form a water-tight seal on one side of the wheel bearing 100, preventing contaminants from entering the inner space 203.

Figure 3:
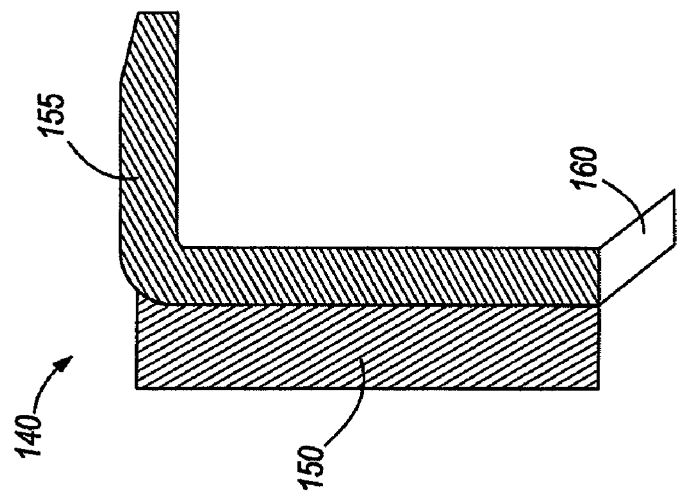
FIG. 3 is a cut-away view of an encoder according to an embodiment of the invention.

FIG. 3 illustrates one embodiment of the encoder 140. The encoder 140 includes a tone wheel 150 and a carrier 155. In some embodiments, the encoder 140 can include a sealing element 160 which can be coupled to the carrier 155 or integrally formed with the tone wheel 150. In other embodiments, the encoder 140 does not include a sealing element. In the embodiment shown, the carrier 155 is formed as a ring and has a generally "L" shape. The carrier 155 is constructed to have relatively high permeability to direct as much as possible of the magnetic flux produced by the tone wheel 150 toward a sensor. In one example, high iron-content steels that are suitable for magnetic core applications can be used to provide high permeability, such as the American Iron and Steel Institute of the Society of Automotive Engineers (AISI/SAE) 1000 series steels, for example ANSI 1006, 1008, 1010, 1018. Using one of these materials, in the 0 Hz frequency operating range of the encoder 140, with the encoder 140 tightly coupled to the carrier 155 (no air gaps), the relative permeability of the carrier 155 could be as high as 2000 or higher. Silicon steel (SiFe) or cobalt steel (CoFe) can also be used to provide high permeability, as well as a wide range of other high permeability materials. The carrier 155 can withstand temperatures from at least −40° C. to at least 150° C., and can be constructed out of SAE 1008 steel or other suitable material. The carrier 155 is press fit into the outer race 105 and has an outside diameter that is slightly larger than an inside diameter of the outer race 105. The difference in the diameters holds the carrier 155 in place in the outer race 105 and causes the carrier 155 to rotate with the outer ring 105. In some embodiments, where the outer race 105 is stationary and the inner race 110 rotates, the carrier 155 is press fit onto the inner race 110.

In the embodiment shown, the tone wheel 150 is a ring having a read diameter of 42.15 mm+/−1 mm, a height of 5.0 mm+/−0.1 mm, and a thickness of 0.8 mm+/−0.1 mm. The read diameter is the diameter at the center of the tone wheel 150 (i.e., halfway between the outer diameter of the tone wheel 150 and the inner diameter of the tone wheel 150). The tone wheel 150 includes 33 magnetic pole pairs (i.e., 66 dipoles) spaced equidistantly from each other around the circumference of the tone wheel 150 and providing at least 1.2 millitesla (mT) of magnetic flux at a distance of 2.1 mm. In this embodiment, the pole pairs have a symmetrical flux density such that an MR sensor produces a signal having a nominal duty cycle of 50% when the tone wheel 150 is rotating past the sensor, and, once established, the duty cycle is very stable and may not vary by more than 5% per revolution. The tone wheel 150 can operate in a temperature range of at least −40° C. to 120° C. with a signal degradation of less than 0.2% per degree C. above 25° C. and has no detectable pole to pole drop out below 120° C. In addition, the tone wheel 150 can withstand temperatures up to 150° C. without sustaining permanent damage. The tone wheel 150 can be constructed of a suitable material such as nitrile rubber (NBR) or highly-saturated NBR (HNBR). In other embodiments, the tone wheel 150 may have a different number and/or configuration of dipoles, and may have different magnetic properties as well.

The tone wheel 150 is mounted to the carrier 155 using a suitable adhesive to form the encoder 140. The encoder 140 is then inserted into the bearing 100 (i.e., the carrier 155 is press fit into the outer race 105 as described above) such that an outer side 200 of the tone wheel 150 is at a depth of 1.55 mm+/−0.09 mm from an outer edge 205 of the inner race 110 of the bearing 100. The depth of the outer side 200 of the tone wheel 150 relative to the outer edge 205 of the inner race 110 is consistent around the bearing 100, resulting in the tone wheel 150 having a relative flatness of 0.1 mm+/−0.01 mm. As shown in FIGS. 1 and 2, the entire tone wheel 150 is positioned within the annular space 203 defined between the inner race 110 and the outer race 105, inwardly of both the outer edge 205 of the inner race 110 and the outer edge 207 of the outer race 105, leaving a space between the outer edges 205, 207 and the outer surface of the tone wheel 150.

Figure 4:
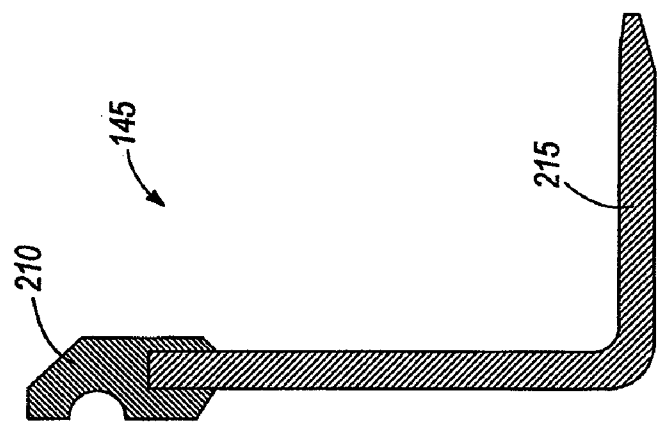
FIG. 4 is a cut-away view of a flinger according to an embodiment of the invention.

FIG. 4 illustrates an embodiment of the flinger 145. The flinger 145 is formed as a ring having a generally "L" shape and includes a sealing element 210 and a support element 215. In the embodiment shown, the flinger 145 is press fit onto the inner race 110 and has an inside diameter that is slightly smaller than an outside diameter of the inner race 110. The difference in the diameters holds the flinger 145 in place on the inner race 110. The flinger 145 is positioned outwardly of the tone wheel 150, separating the tone wheel 150 from the exterior of the wheel bearing 100 and protecting the tone wheel 150. In one embodiment, the flinger is designed to be as inert to the magnetic field as possible, while also serving to protect the magnetic surface from abrasions or build up of magnetic material between the sensor and the dipoles. Permeability increases at bends in the flinger 145; therefore, the flinger 145 is formed to be straight and not have any bends between the tone wheel 150 and a sensor (described below), such that the flinger 145 has little or no impact on the magnetic flux produced by the tone wheel 150 and detected by the sensor. The sealing element 210 can be constructed of a suitable material to provide a flexible, water-tight seal (e.g., nitrile rubber). The support element 215 can be constructed out of a material having relatively low permeability, such as SAE 304 stainless steel and austenitic (Cr—Ni) stainless steel or other suitable material. Such steels have very low relative permeability which may approach 1.01, although they may display magnetic properties when cold worked. Other low permeability materials may also be used. In some embodiments, the flinger 145 is press fit into the outer race 105, rather than the inner race 110. For example, the flinger 145 may be press fit onto the outer race 105 in an embodiment where the outer race 105 is stationary and the inner race 110 rotates. Further, the flinger 145 may be coupled to the same race 105, 110 as the tone wheel 150 in some embodiments.

Figure 5:
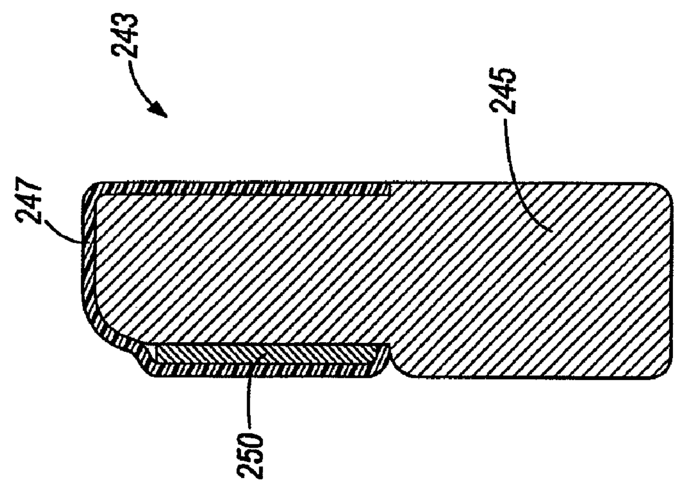
FIG. 5 is a cut-away view of a wheel spacer/sensor assembly according to an embodiment of the invention.

FIG. 5 illustrates one embodiment of a wheel spacer/sensor assembly 243 suitable for use in connection with the wheel bearing 100. The wheel spacer/sensor assembly 243 includes a wheel spacer 245 and a sensor 250 connected thereto. In one embodiment, the sensor 250 is an anisotropic magnetoresistive (MR) sensor 250 (such as model VF401 manufactured by Honeywell, Inc.). The wheel spacer 245 can be machined to a high tolerance out of a suitable material. The sensor 250 can be mounted to the spacer 245 (e.g., via an adhesive) and a portion of the spacer 245, including the sensor 250, can be overmolded (shown as 247) to protect the sensor 250. In some embodiments, the sensor 250 can be mounted onto the wheel spacer 245 by overmolding. Mounting the sensor 250 on the spacer can produce several benefits. For example, the spacer forms a very rigid mount, and obviates the need of a number of brackets found in existing devices. Additionally, this mounting configuration assists in aligning the sensor 250 so that the sensor 250 and the encoder 140 are referenced from the same datum (e.g., the centerline of the axle). Further, this mounting configuration helps avoid secondary vibration patterns, which may be injected into the system by other existing mounting configurations.

Figure 9:
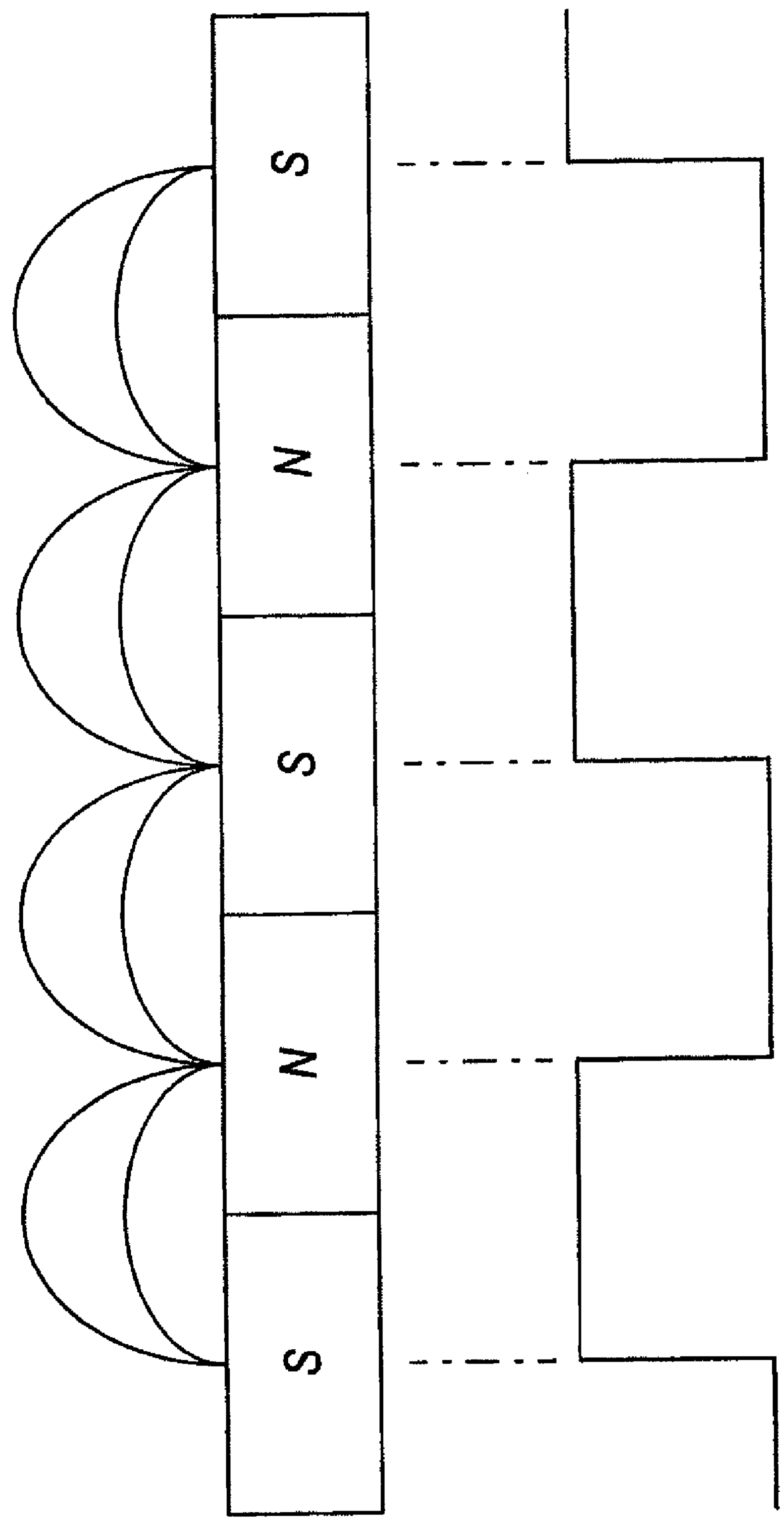
FIG. 9 is a diagram of an output signal of a sensor relative to a magnetic field according to an embodiment of the invention.

As described in more detail below, when a magnetic field passes by the sensor 250, a resistance of the sensor 250 changes based on the polarity of the magnetic field, causing the sensor 250 to output a signal having one of two current levels. The sensor 250 can function with input power ranging, for example, from 4.5 Vdc to 16.5 Vdc. In some embodiments, input power is approximately 14.2 Vdc. The current signal that the sensor 250 outputs modulates between a high signal of 14.0 ma+/−20% and a low signal of 7.0 ma+/−20%, providing a square-wave current signal having a frequency range of 0 Hz to about 2,000 Hz. FIG. 9 illustrates an example of such a square wave signal. In another embodiment, a Hall-type sensor may be used in the bearing 100. Incorporating a Hall sensor may require modifications to the design, such as changing the number of poles and the flux density per pole, or adjusting the distance from the encoder to the sensor. A new algorithm may also have to be adapted for this purpose, for example, to tolerate a lower fidelity at slower speeds.

Figure 6:
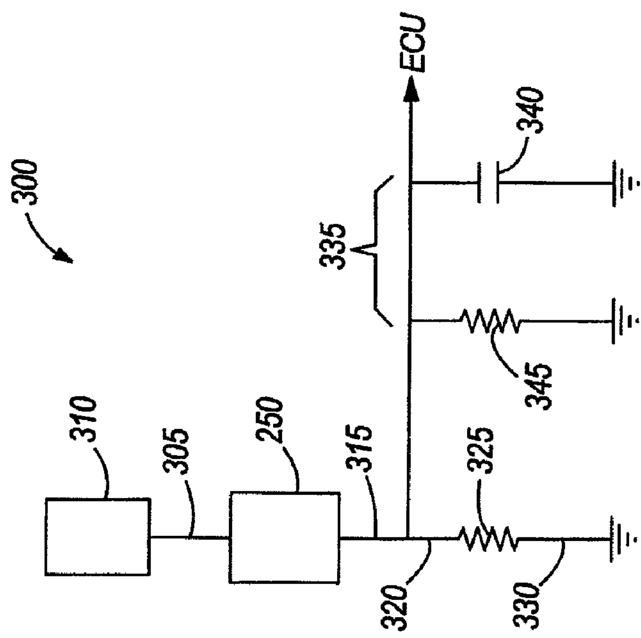
FIG. 6 is a schematic diagram of a sensor circuit according to an embodiment of the invention.

FIG. 6 is a schematic diagram of one embodiment of a sensor circuit 300 for use with a sensor 250 as described above. A first lead 305 of the sensor 250 is coupled to a voltage source 310 (e.g., a positive terminal of a motorcycle battery). A second lead 315 of the sensor 250 is coupled to a first lead 320 of a current sensing resistor 325. A second lead 330 of the current sensing resistor 325 is coupled to ground. In the embodiment shown, the resistance of the current sensing resistor 325 is in the range of 100Ω to 300Ω. In addition, the second lead 315 of the sensor 250 is coupled to a filter circuit 335 including a capacitor 340 (e.g., 1000 pF) and a resistor 345 (e.g., 10 kΩ) connected in parallel. The filter circuit 335 is also coupled to ground. It is understood that the sensor circuit may be differently configured in other embodiments.

The current sensing resistor 325 converts the square-wave current signal from the sensor 250 into a square-wave voltage signal. In some embodiments, the square-wave voltage signal has a range of about 0.7 vdc to about 2.1 vdc (i.e., 7 ma×100Ω to 7 ma×300Ω) for the low portion of the square-wave and a range of about 1.4 vdc to about 4.2 vdc (i.e., 14 ma×100Ω to 7 ma×300Ω) for the high portion of the square-wave. An engine control unit (ECU) or other controller (e.g., an anti-lock brake system controller) receives the square-wave voltage signal and measures the frequency of the signal to determine the speed of the wheel. The controller can use the speed of the wheel to, among other things, prevent the wheel from locking up during braking (i.e., anti-lock braking) or provide an indication of vehicle speed to an operator.

Figure 7:
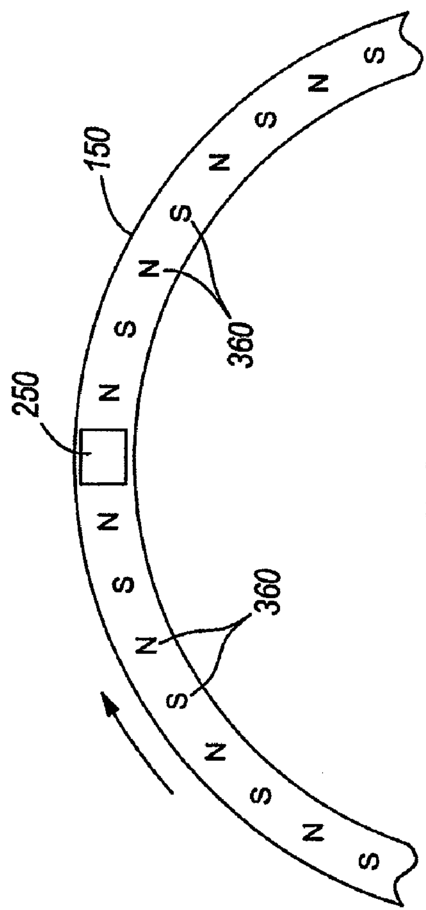
FIG. 7 depicts a tone wheel passing by a sensor according to an embodiment of the invention.

FIGS. 7 and 8A-8C illustrate the operation of the tone wheel 150 and the sensor 250. As shown in FIG. 7, the tone wheel 150 rotates with respect to the sensor 250 (e.g., in the direction of the arrow), causing a plurality of magnetic pole pairs 360 positioned in the tone wheel 150 to pass by the sensor 250, exposing the sensor 250 to the magnetic fields provided by the pole pairs 360. In the embodiment shown in FIGS. 1-6, the tone wheel 150 rotates with the outer race 105 of the bearing 100, but it is understood that in other embodiments, the tone wheel may be mounted differently. For example, it is contemplated that the sensor 250 may be configured to rotate relative to a stationary tone wheel, which may involve use of a Radio Frequency (RF) source to power the sensor, along with a similar transition of its outputs to and from a local receiver.

As shown in FIGS. 8A-8C, the magnetic fields extend between the pole pairs 360 starting as a relatively vertical field at each pole pair 360 (FIG. 8B) and transforming into a relatively parallel field between the pole pairs 360 (FIG. 8C). When the bearing 100 and wheel spacer/sensor assembly 243 are positioned adjacent to one another (as described below), the sensor 250 is positioned to be centered in the parallel fields (as shown in FIG. 8C). The tone wheel 150 is sized to provide sufficient magnetic fields such that variances due to tolerances and heat do not move the sensor 250 out of the magnetic fields. In addition, this configuration provides a natural filter to vibration of the tone wheel 150 or sensor 250 during operation.

As shown in FIG. 9, the sensor 250 outputs a square wave current signal as the pole pairs 360 pass by the sensor 250. The output signal of the sensor 250 transitions as the vertical magnetic fields (FIG. 8B) pass by the sensor 250. As a North (N) vertical magnetic field passes the sensor 250, the sensor 250 transitions to a 7 ma output signal. As a South (S) vertical magnetic field passes the sensor 250, the sensor 250 transitions to a 14 ma output signal. The frequency of the square wave, output by the sensor 250, corresponds to the rotational speed of the outer race 105 of the bearing 100, and thus to the rotational speed of a wheel coupled to the bearing 100. Due to the fact that, in the embodiment shown, the tone wheel 150 includes 33 pole pairs 360, the frequency of the output of the sensor 250 is divided by 33 to determine the number of complete rotations of the outer race 105. The number of rotations can then be determined for a time period (e.g., rotations per minute) to obtain a speed. It is understood that the calculation for determining wheel speed may be altered as necessary if the tone wheel 150 has a different number of pole pairs.

During operation of the wheel speed sensor 250, the output signal of the sensor 250 has a maximum±2% single pitch error and a maximum total pitch error of 5% over the entire operating frequency range (e.g., 0 Hz to 2,000 Hz) and operating temperature range (e.g., −40° C. to 120° C.).

Single pitch error (SPE) is defined as the percentage deviation of an individual period length (Tn) from the mean value of all period lengths (Tavg) for one complete revolution of the tone wheel 150. A single period length refers to the duration of one signal pulse of the sensor 250, as generated by the rotation of the magnetic pole pairs 360.

Therefore, the single pitch error is:

$$SPE(\%)=[(T_n-T_{avg})/T_{avg}]\times 100.$$

Total pitch error (TPE) is defined as the difference between the maximum individual period length (Tmax) and the minimum individual period length (Tmin), for one complete revolution of the tone wheel 150. A single period length refers to the duration of one signal pulse of the sensor 250, as generated by the rotation of the magnetic pole pairs 360.

Therefore, the total pitch error deviation is:

$$TPE(\%)=(T\max\%-T\min\%)$$

The total pitch error deviation on adjacent pole pairs 360 does not exceed 5%. Therefore, if one pole has a pitch error of +3%, the adjacent pole pair cannot have a pitch error exceeding −2%.

Figure 10:
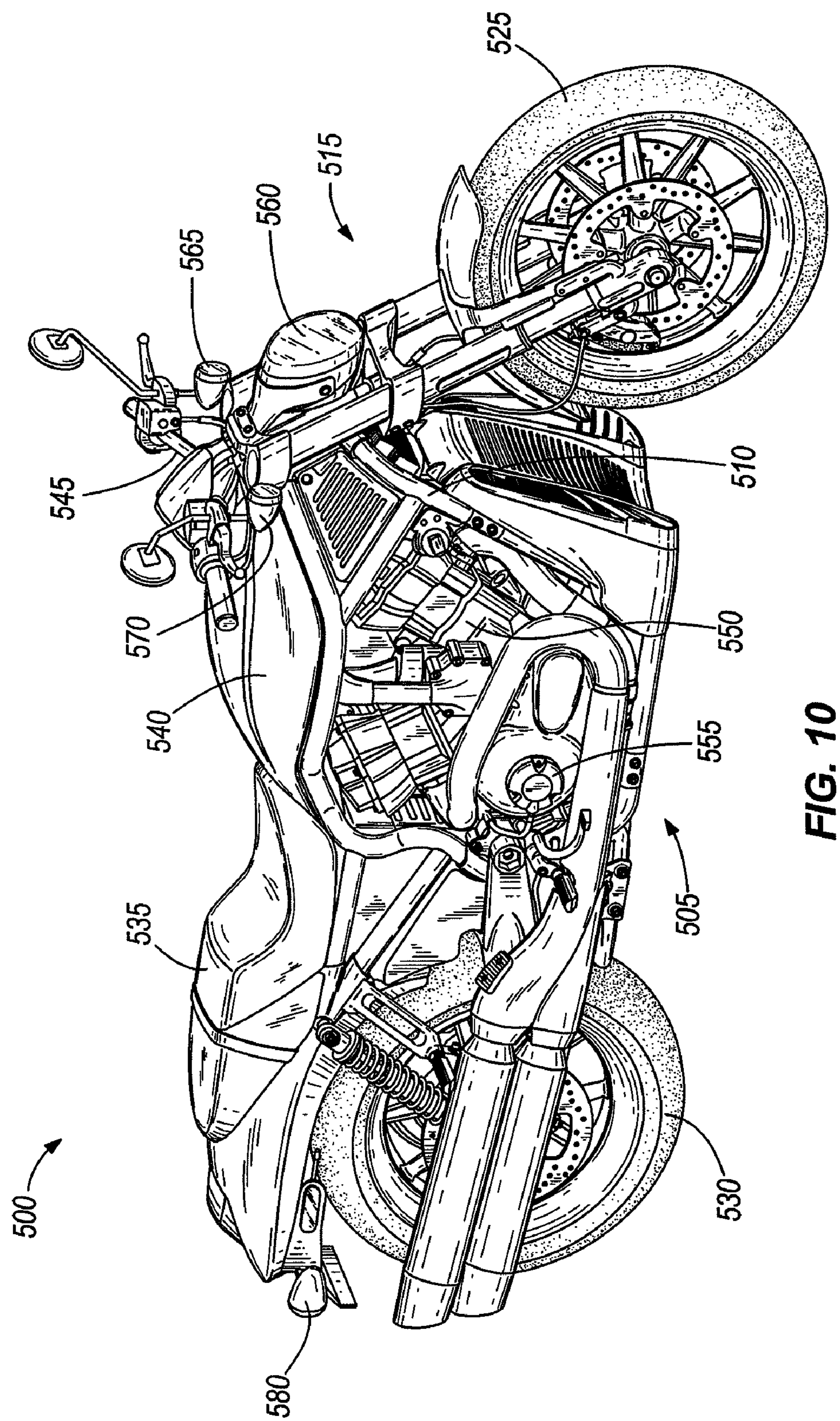
FIG. 10 is a perspective view of an exemplary motorcycle incorporating an embodiment of the invention.
Figure 11:
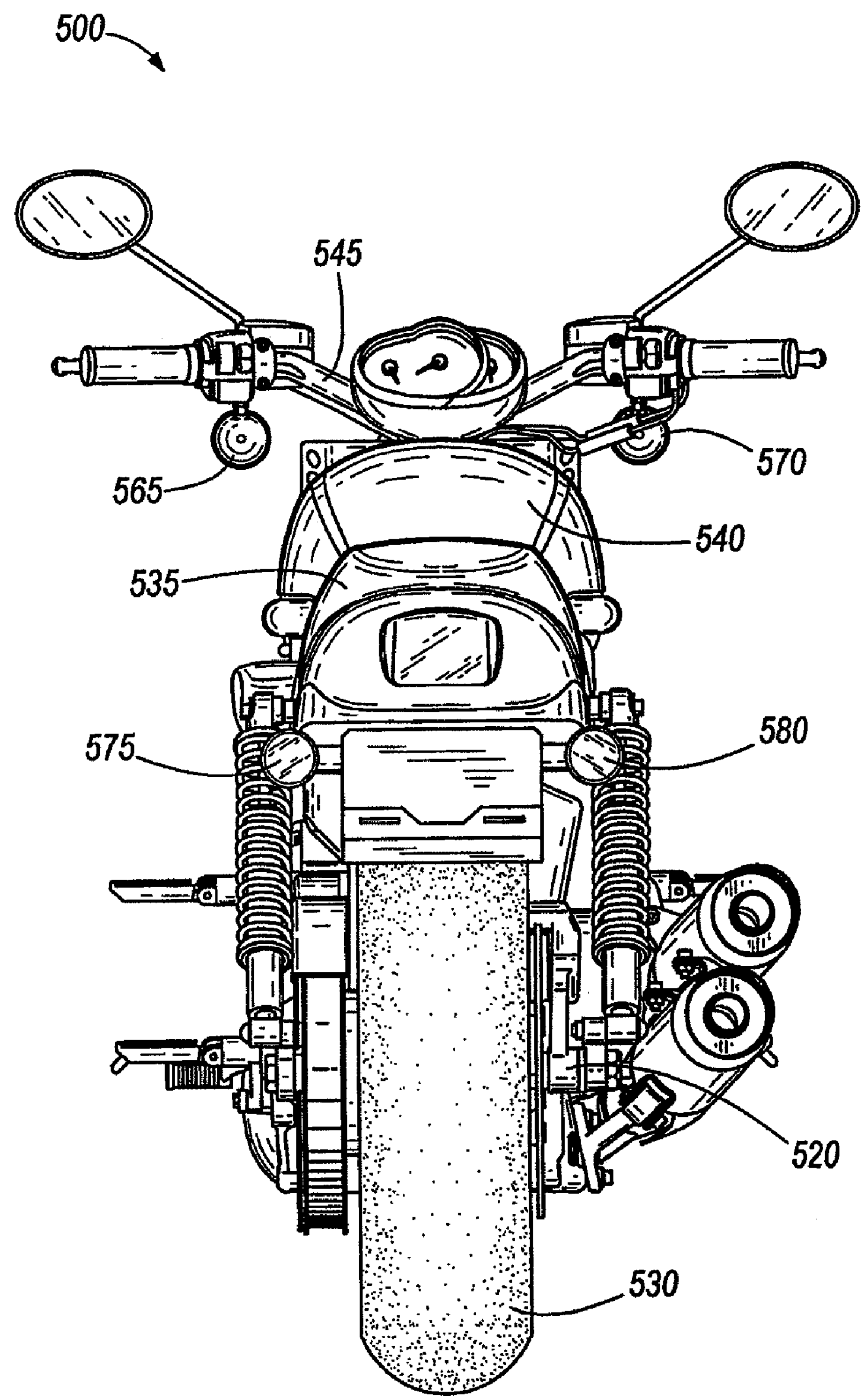
FIG. 11 is a rear view of an exemplary motorcycle incorporating an embodiment of the invention.
Figure 12:
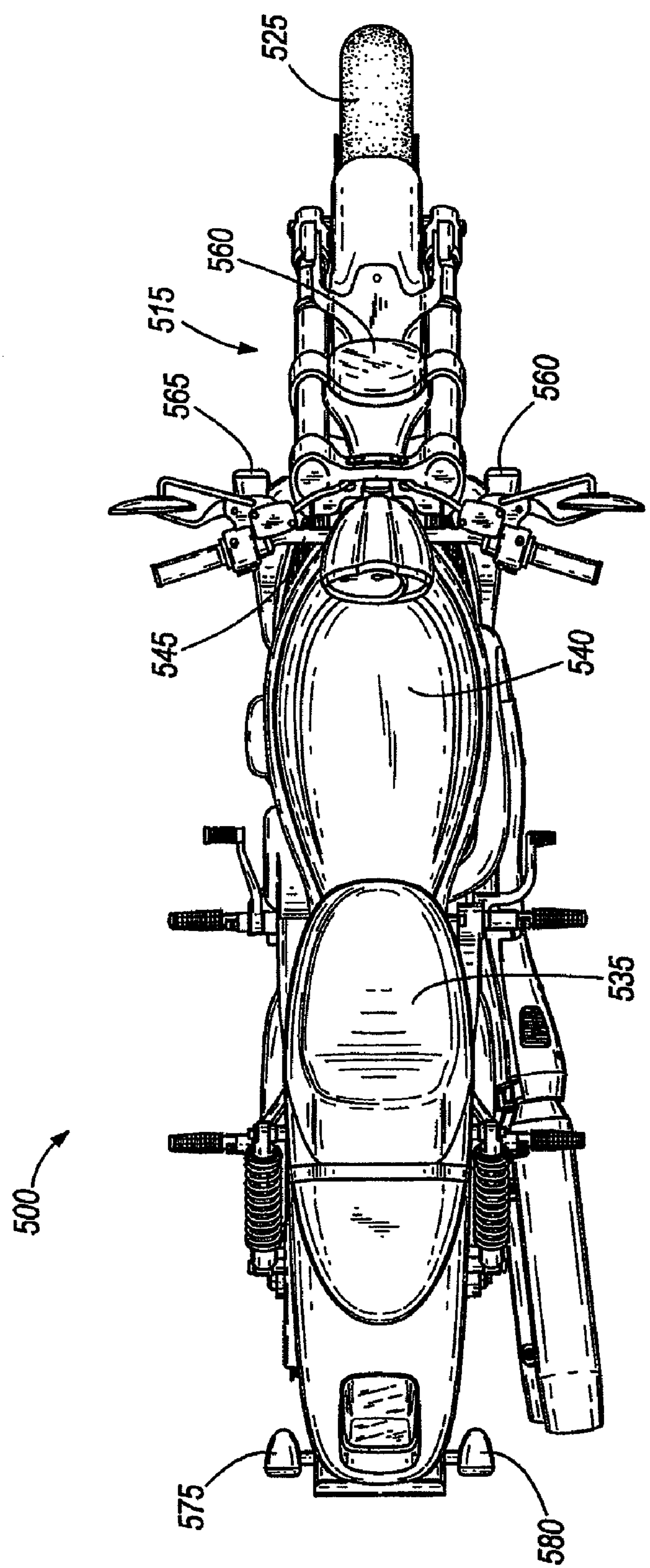
FIG. 12 is a top view of an exemplary motorcycle incorporating an embodiment of the invention.

FIGS. 10-12 illustrate perspective, rear, and top views of a motorcycle 500 incorporating one embodiment of a wheel bearing 100 having a wheel speed sensor. The motorcycle 500 includes a drive assembly 505, a frame 510, a front fork assembly 515, a swing arm or rear fork assembly 520, a front wheel 525, a rear wheel 530, a seat 535, and a fuel tank 540. The frame 510 supports the drive assembly 505, the front fork assembly 515, the rear fork assembly 520, the seat 535, and the fuel tank 540. The front fork assembly 515 is pivotally supported at a front end of the motorcycle 500 and supports the front wheel 525. The front fork assembly 515 includes a pair of handlebars 545 for steering the motorcycle 500. The rear fork assembly 530 is coupled to the frame 510 at a rear end of the motorcycle 500 and rotatably supports the rear wheel 530. The seat 535 is coupled to the frame 510 and is configured for supporting a rider. The fuel tank 540 is supported by the frame 510 and provides fuel to the drive assembly 505.

The drive assembly 505 includes an engine 550 and a transmission 555. The engine 550 and the transmission 555 comprise distinct, independent components of the drive assembly 505. The engine 550 includes an output shaft (not shown), such as a crankshaft, which includes a primary drive sprocket (not shown) for driving a primary chain (not shown) in a conventional manner to power the transmission 555.

The front and rear wheels 525 and 530 ride on wheel bearings (not shown) which are mounted on axles (not shown).

Figure 13:
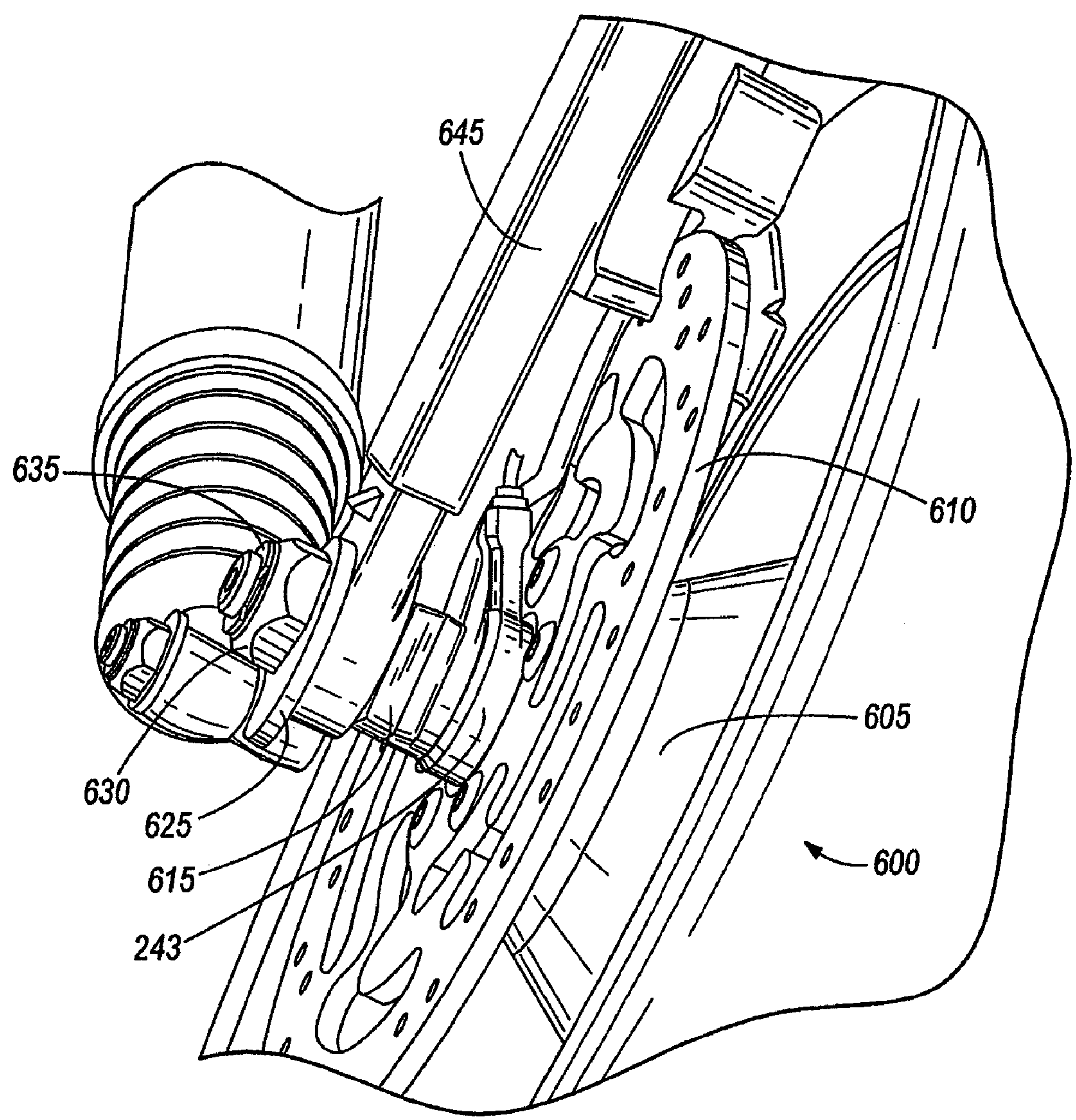
FIG. 13 is a perspective view of a rear wheel mounting assembly according to an embodiment of the invention.
Figure 14:
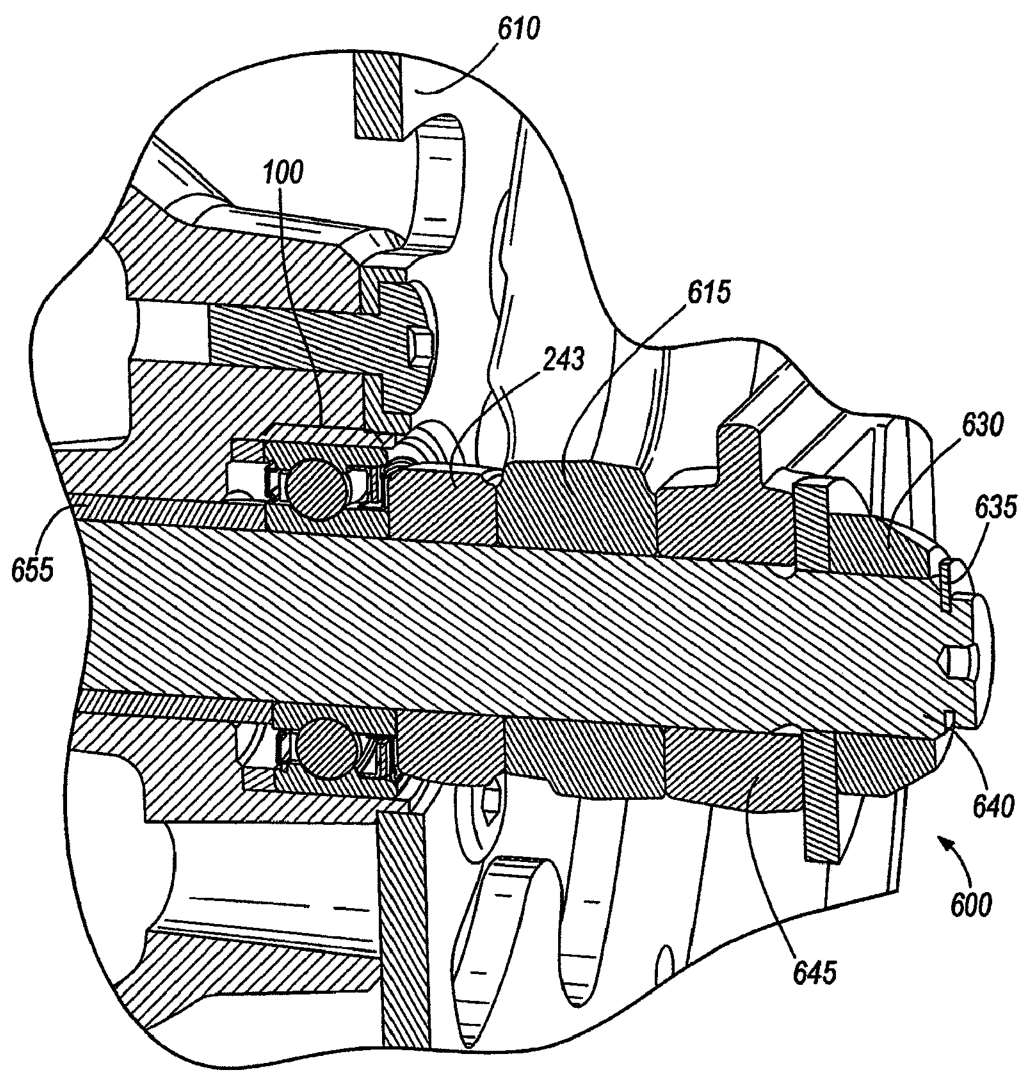
FIG. 14 is a cut-away view of a rear wheel mounting assembly according to an embodiment of the invention.
Figure 15:
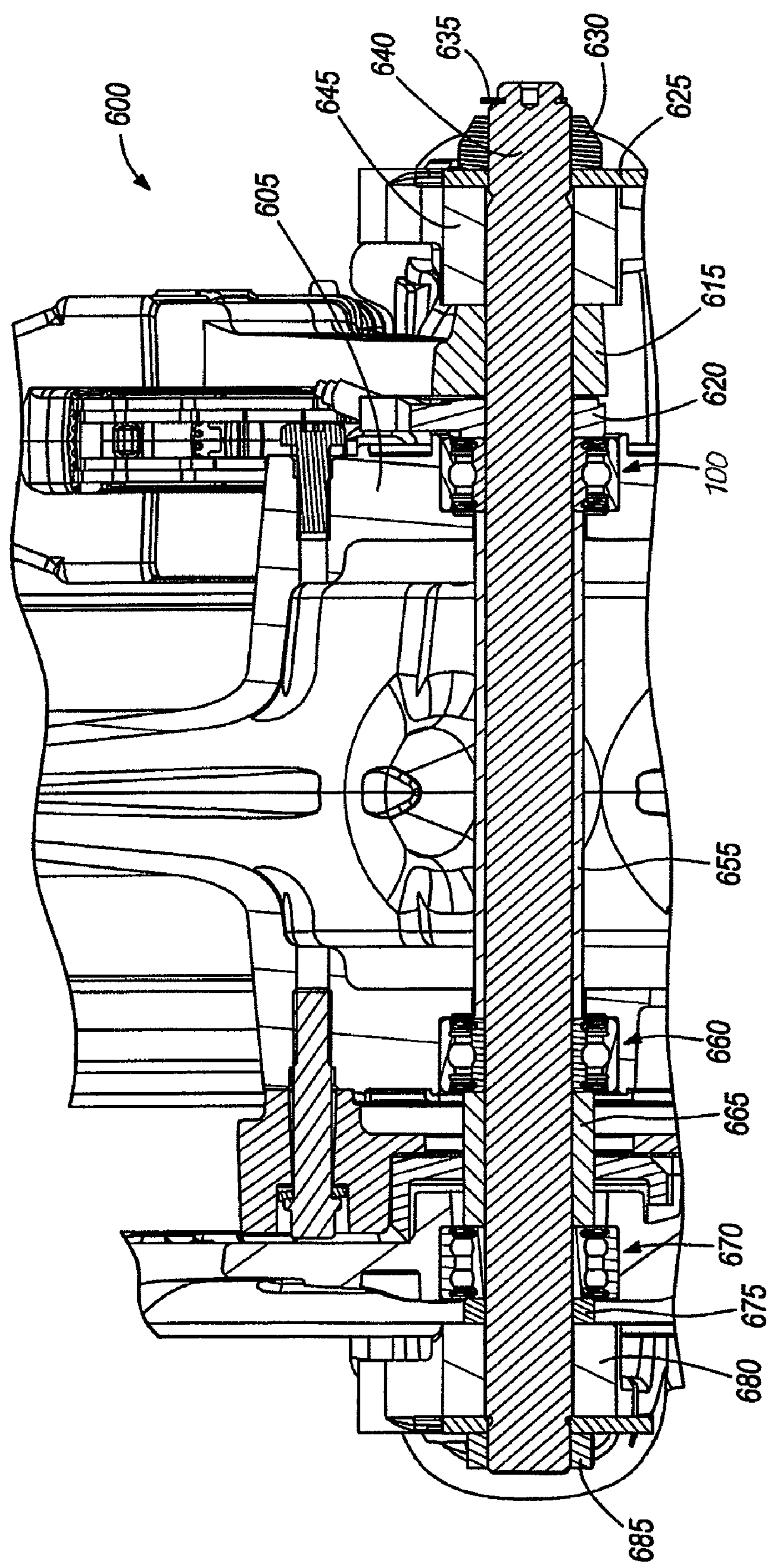
FIG. 15 is a cut-away view of a rear wheel mounting assembly according to an embodiment of the invention.

FIGS. 13-15 illustrate one embodiment of a rear wheel mounting assembly 600 for a motorcycle incorporating the wheel speed sensor described above. The assembly 600 includes a wheel 605, a rotor 610 mounted to the wheel 605, a brake caliper 615, the wheel spacer/sensor assembly 243, a washer 625, a nut 630, a retaining clip 635, an axle 640, a first swingarm 645, the first wheel bearing 100 including the encoder 140, a wheel sleeve 655, a second wheel bearing 660, a sprocket spacer 665, a sprocket bearing 670, a third spacer 675, a second swingarm 680, and an axle end 685.

As shown in FIG. 15, the rear wheel mounting assembly 600 is assembled by feeding the axle 640 through an aperture in the second swingarm 680 until the axle end 685 abuts the second swingarm 680. Next, the components of the rear wheel mounting assembly 600 are positioned on the axle 640, each component abutting its adjacent components as shown in FIG. 15. Once all the components are in position, the nut 630 is screwed onto the axle 640, holding all of the elements in place with substantially no play. The retaining clip 635 prevents the nut 630 from loosening during operation.

Figure 16:
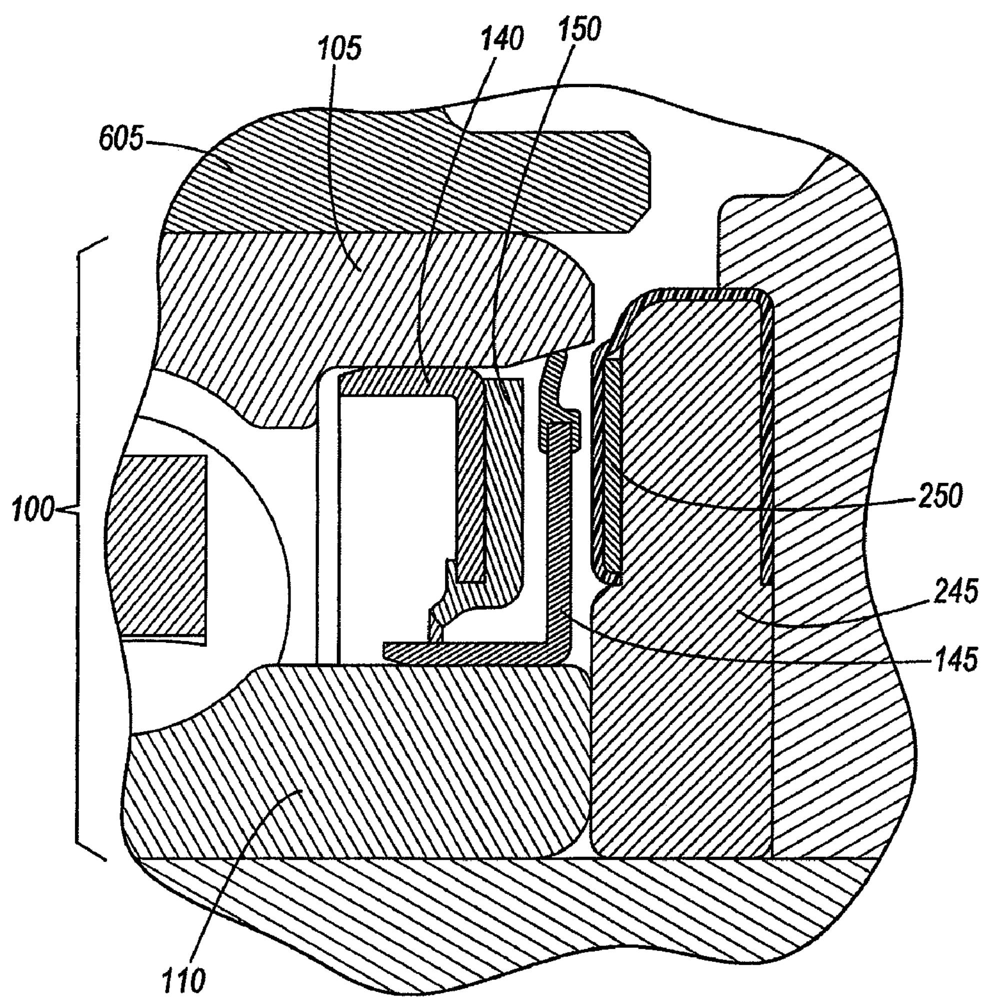
FIG. 16 is a cut-away view of a bearing and a wheel spacer/sensor assembly according to an embodiment of the invention.

FIG. 16 illustrates a close-up cut-away view of a portion of the wheel assembly 600 showing the positioning of the first wheel bearing 100 including the encoder 140 (i.e., the carrier 155 and the tone wheel 150), and the wheel spacer/sensor assembly 243 including the sensor 250. The tight tolerances achievable in producing the bearing 100 and the wheel spacer/sensor assembly 243 (i.e., by machining and injection molding) enable the sensor 250 to be precisely positioned relative to the tone wheel 150, ensuring that the sensor 250 is centered in the magnetic fields produced by the tone wheel 150. This precision, along with the use of an MR sensor, enables the wheel speed sensor to be manufactured in a significantly smaller size than previous wheel speed sensors. In addition, all of the components are referenced off of the axle 640 which functions as a common datum line.

Positioning the encoder 140 in the wheel bearing 100 (i.e., behind the flinger 145) hides the tone wheel 150 from view. Positioning the sensor 250 on the wheel spacer 245 hides the sensor 250 behind the swingarms of the motorcycle, resulting in a wheel speed sensor that is almost completely hidden from view. In addition, assembly of the wheel speed sensor is simplified by mounting the encoder 140 within the bearing 100 and requiring only that the wheel spacer/sensor assembly 243 abut the bearing 100. As a result, although separate components of the wheel speed system rest firmly on each other, there is no direct contact of any closely situated or aligned moving parts.

The wheel speed sensor can also or alternatively be mounted to a front wheel mounting assembly. The front wheel mounting assembly can include some of the same components as the rear wheel mounting assembly 600, such as the first wheel bearing 100 including the tone wheel 150 and the wheel spacer/sensor assembly 243 including the sensor 250.

Because the sensor 250 is molded onto the wheel spacer 245, no special tools, beyond tools already used at a motorcycle maintenance shop, are required to remove the sensor 250 for repair or replacement.

The wheel speed sensor can withstand exposure to harsh environments encountered by a motorcycle (e.g., unleaded gasoline, motor oil, brake fluid, cleaners, etc.). The structure of the wheel speed sensor makes it less susceptible to air gap inconsistencies caused by part wear (e.g., tone wheel runout, tone wheel tooth damage, axle end play, bearing wear) and road surface inconsistencies. The wheel speed sensor can also withstand the wide temperature range encountered by a motorcycle and is not affected by the axial loads placed on the wheel speed sensor by the motorcycle. Also, the gap between the sensor 250 and the flinger 145 is small enough to prevent foreign materials from lodging in the gap and affecting the operation of the wheel speed sensor 250. The flinger 145 also protects the tone wheel 150 from damage or contamination. In addition, the bearing 100 can be filled with bearing grease to reduce friction between the components of the bearing 100. The bearing grease has been found to not affect the operation of the wheel speed sensor 250 (i.e., the magnetic fields produced by the tone wheel 150 are unaffected by the grease). Further, the operation of the wheel speed sensor 250 is not affected by anti-seize lubricant, having a graphite component, used in assembly of a motorcycle.

In some embodiments, an MR sensor can be molded to a flinger. In other embodiments, a bearing including an encoder does not include a flinger element. In such embodiments, the encoder includes a sealing member to seal in bearing grease and seal out contaminants.

The above embodiments have been described using specific sizes and dimensions of components; however, other embodiments using different sizes and dimensions of components are within the scope of the invention. In addition, the above embodiments have been described using an MR sensor; however, it is within the scope of the invention to use other types of sensors (e.g., Hall Effect sensors).

The invention has been described in embodiments of wheel speed sensors; however, the invention has application in any rotating device using a bearing and for which a speed is monitored, for example a conveyor or a motor or other type of vehicle (e.g., an automobile). In addition to monitoring speed, the invention can be applicable to position sensing (i.e., by counting the number of pulses).

Thus, the invention provides, among other things, a relatively small, easily installed wheel speed sensor that can withstand the vibration and contaminants normally encountered by a motorcycle. Various features and advantages of the invention are set forth in the following claims.

What is claimed is:

1. A rotation sensor assembly, comprising:

a bearing including:

a first race having an outer edge, a second race, a plurality of ball bearings positioned between the first race and the second race, a carrier coupled to the second race and constructed of a material having a relatively high permeability, and a tone wheel coupled to the carrier, the tone wheel including a plurality of magnetic pole pairs distributed around a circumference of the tone wheel;

a spacer abutting the first race;

a sensor mounted to the spacer and positioned adjacent the tone wheel, wherein the sensor is configured to sense rotation of the tone wheel relative to the sensor by sensing the magnetic pole pairs during said rotation; and a flinger press fit onto one of the first race and the second race, the flinger positioned between the tone wheel and the sensor and sealing the carrier and the tone wheel within the bearing, wherein the carrier is press fit onto the second race such that the tone wheel is at a fixed depth from an outer edge of the first race, the tone wheel having a relative flatness of 0.1 mm, and a distance between the sensor and the tone wheel is fixed at approximately 1.87 mm+/−0.27 mm.

2. The rotation sensor assembly of claim 1, wherein a portion of the flinger directly adjacent both the tone wheel and the sensor is straight, and the flinger is constructed of a material having a relatively low permeability.

3. The rotation sensor assembly of claim 1, wherein the first race is a stationary inner race and the second race is a rotating outer race, and wherein the tone wheel rotates with the second race and the sensor is stationary.

4. The rotation sensor assembly of claim 1, wherein the sensor is a magnetoresistive sensor.

5. The rotation sensor assembly of claim 1, wherein the sensor is configured to provide a square-wave current output indicative of a rotational speed of the second race.

6. The rotation sensor assembly of claim 1, wherein a distance between the tone wheel and the sensor is controlled by the spacer and the first race, the spacer and first race being machined parts capable of achieving extremely tight tolerances enabling a distance between the sensor and the tone wheel to be highly accurate when the spacer is abutted against the first race.

7. The rotation sensor assembly of claim 1, further comprising a controller connected to the sensor and receiving output from the sensor, wherein the controller is configured to use the output of the sensor to perform at least one of (1) determining a rotational speed of the bearing and (2) detecting a presence or absence of rotation of the bearing.

8. A bearing assembly for use with a speed sensor assembly, comprising:

a first race having an outer edge;

a second race having an outer edge;

a plurality of ball bearings positioned between the first race and the second race, the ball bearings positioned inwardly of the outer edges of the first race and the second race; and a tone wheel coupled to the second race, the tone wheel including a plurality of magnetic pole pairs distributed around a circumference of the tone wheel, wherein the entire tone wheel is positioned inwardly of the outer edge of the second race, such that a space is defined between the tone wheel and the outer edge of the second race, and wherein the tone wheel is positioned at a fixed depth from the outer edge of the first race, the tone wheel having a relative flatness of 0.1 mm, and a distance between the sensor and the tone wheel is fixed at approximately 1.87 mm+/−0.27 mm.

9. The bearing assembly of claim 8, wherein the entire tone wheel is positioned inwardly of the outer edges of both the first race and the second race such that a space is defined between the tone wheel and the outer edges of the first race and the second race.

10. The bearing assembly of claim 8, further comprising a flinger coupled to one of the first race and the second race and positioned between the tone wheel and the outer edge of the second race.

11. The bearing assembly of claim 10, wherein a portion of the flinger directly adjacent both the tone wheel and the sensor is straight, and the flinger is constructed of a material having a relatively low permeability.

12. The bearing assembly of claim 8, further comprising a carrier coupled to the second race and constructed of a material having a relatively high permeability, the tone wheel being connected to the carrier to couple the tone wheel to the second race.

13. A rotation sensor assembly comprising the bearing assembly of claim 8 and a sensor positioned adjacent the tone wheel and configured to detect rotation of the tone wheel.

14. A rotation sensor assembly, comprising:

a bearing including:

a first race having an outer edge, a second race, a plurality of ball bearings positioned between the first race and the second race, a carrier coupled to the second race and constructed of a material having a relatively high permeability, and a tone wheel coupled to the carrier, the tone wheel including a plurality of magnetic pole pairs distributed around a circumference of the tone wheel;

a spacer abutting the first race; and a sensor mounted to the spacer and positioned adjacent the tone wheel, wherein the sensor is configured to sense rotation of the tone wheel relative to the sensor by sensing the magnetic pole pairs during said rotation, wherein the carrier is press fit onto the second race such that the tone wheel is at a fixed depth from an outer edge of the first race, the tone wheel having a relative flatness of 0.1 mm, and a distance between the sensor and the tone wheel is fixed at approximately 1.87 mm+/−0.27 mm.

15. The rotation sensor assembly of claim 14, further comprising a flinger press fit onto one of the first race and the second race, the flinger positioned between the tone wheel and the sensor and sealing the carrier and the tone wheel within the bearing.

16. The rotation sensor assembly of claim 15, wherein a portion of the flinger directly adjacent both the tone wheel and the sensor is straight, and the flinger is constructed of a material having a relatively low permeability.

17. The rotation sensor assembly of claim 14, wherein the first race is a stationary inner race and the second race is a rotating outer race, and wherein the tone wheel rotates with the second race and the sensor is stationary.

18. The rotation sensor assembly of claim 14, wherein the sensor is a magnetoresistive sensor.

19. The rotation sensor assembly of claim 14, wherein the sensor is configured to provide a square-wave current output indicative of a rotational speed of the second race.

20. The rotation sensor assembly of claim 14, wherein a distance between the tone wheel and the sensor is controlled by the spacer and the first race, the spacer and first race being machined parts capable of achieving extremely tight tolerances enabling a distance between the sensor and the tone wheel to be highly accurate when the spacer is abutted against the first race.

21. The rotation sensor assembly of claim 14, further comprising a controller connected to the sensor and receiving output from the sensor, wherein the controller is configured to use the output of the sensor to perform at least one of (1) determining a rotational speed of the bearing and (2) detecting a presence or absence of rotation of the bearing.

* * * * *